(Model.)
C. W. BALL & T. DAVIS.
Vehicle Wheel.
No. 241,276. Patented May 10. 1881.
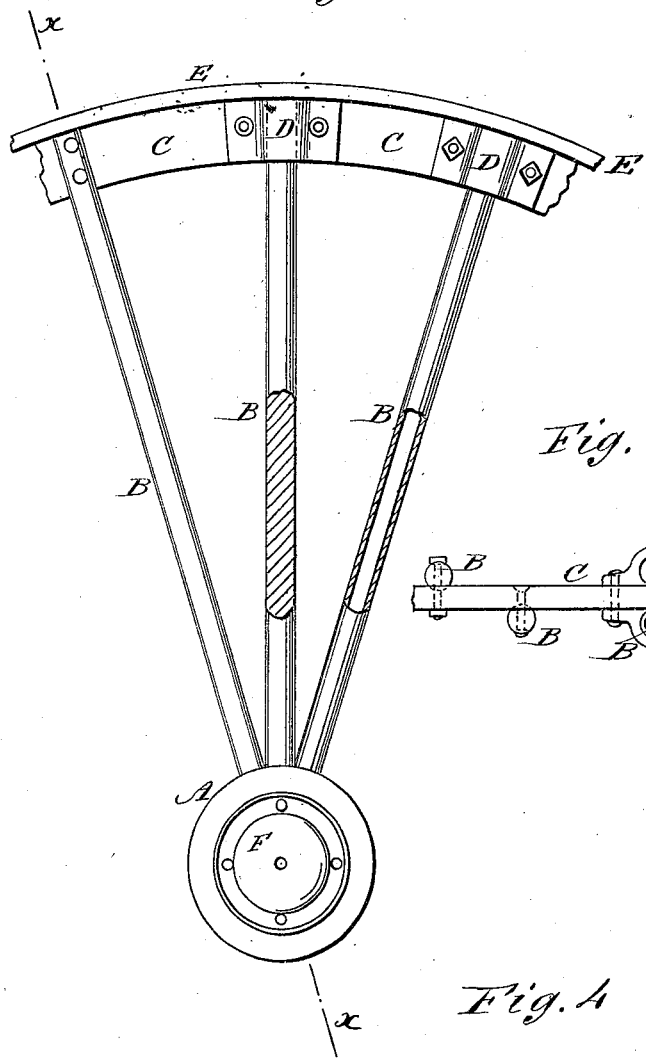
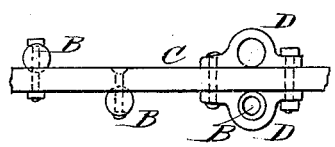
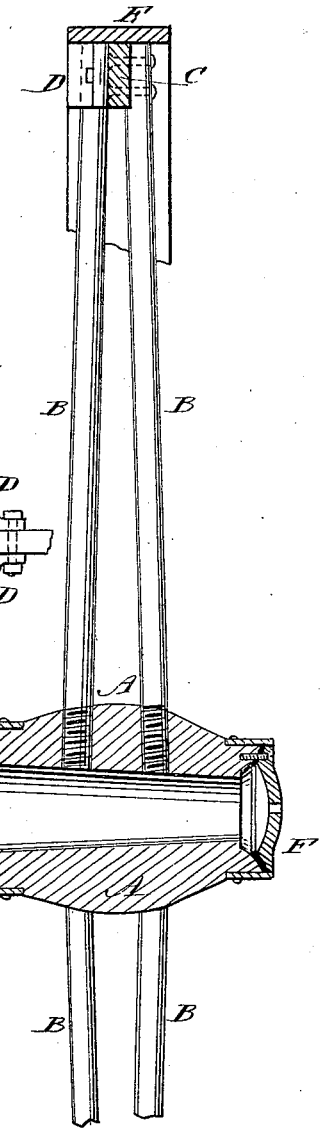
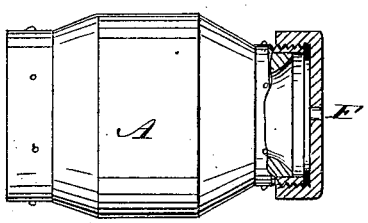
WITNESSES:
C. Neveux
E. Sedgwick
INVENTOR:
C. W. Ball
T. Davis
BY
Munn & Co
ATTORNEYS.

UNITED STATES PATENT OFFICE.

CHARLES W. BALL AND THOMAS DAVIS, OF MACON, ILLINOIS.

VEHICLE-WHEEL.

SPECIFICATION forming part of Letters Patent No. 241,276, dated May 10, 1881.

Application filed December 30, 1880. (Model.)

*To all whom it may concern:*

Be it known that we, CHARLES W. BALL and THOMAS DAVIS, of Macon, Macon county, Illinois, have invented a new and useful Improvement in Vehicle-Wheels, of which the following is a specification.

Figure 1 is a side elevation of a part of one of our improved wheels. Fig. 2 is a sectional elevation taken through line *x x*, Fig. 1. Fig. 3 is a plan view of a part of the wheel; and Fig. 4 represents a modification of the oiler.

Similar letters of reference indicate corresponding parts.

The invention consists in combining, with the spokes of a wheel, a tire and metallic felly, forming a T-bar, and spoke-sockets arranged on both sides of the felly, whereby strength and durability are secured to the wheel.

A represents the hub of a wheel, which may be made of wood, or of iron, or partly of wood and partly of iron.

B are the spokes, which may be solid or tubular, and which have screw-threads cut upon their inner ends to screw into screw-holes in the hub A.

C is a felly, which is made of a piece of bar iron or steel bent edgewise into a circle and having its ends welded together. The felly C may be made plain, or it may be crimped or cor-
rugated between the spokes B. The outer ends
of the spokes B are placed alternately upon the opposite sides of the felly C in keepers or sockets D, and the said keepers or sockets secured to the sides of the felly C. With this construction the keepers D hold the ends of the spokes B in place, and also form an additional support to the tire E, which can be shrunk on in the ordinary manner.

If desired, keepers D can be attached to the felly C, between the spokes B, to further support the tire E. This construction gives to the wheel the strength of a T-iron rim, and at a much less expense.

F is a plate secured to the end of hub, to form an oil-chamber at the end of journal and serve as a dust or mud guard.

Having thus described our invention, we claim as new and desire to secure by Letters Patent—

In a vehicle-wheel, the combination, with the spokes B, of the tire and felly, forming a T-bar, and sockets secured on each side of said felly, as shown and described.

CHARLES WESLEY BALL.
   THOMAS DAVIS.

Witnesses:
 JAS. A. COOK,
 J. U. RORCOW.